March 8, 1938. A. E. LARSEN ET AL 2,110,443
EMPENNAGE FOR ROTARY WINGED AIRCRAFT
Filed Feb. 29, 1936  2 Sheets-Sheet 1
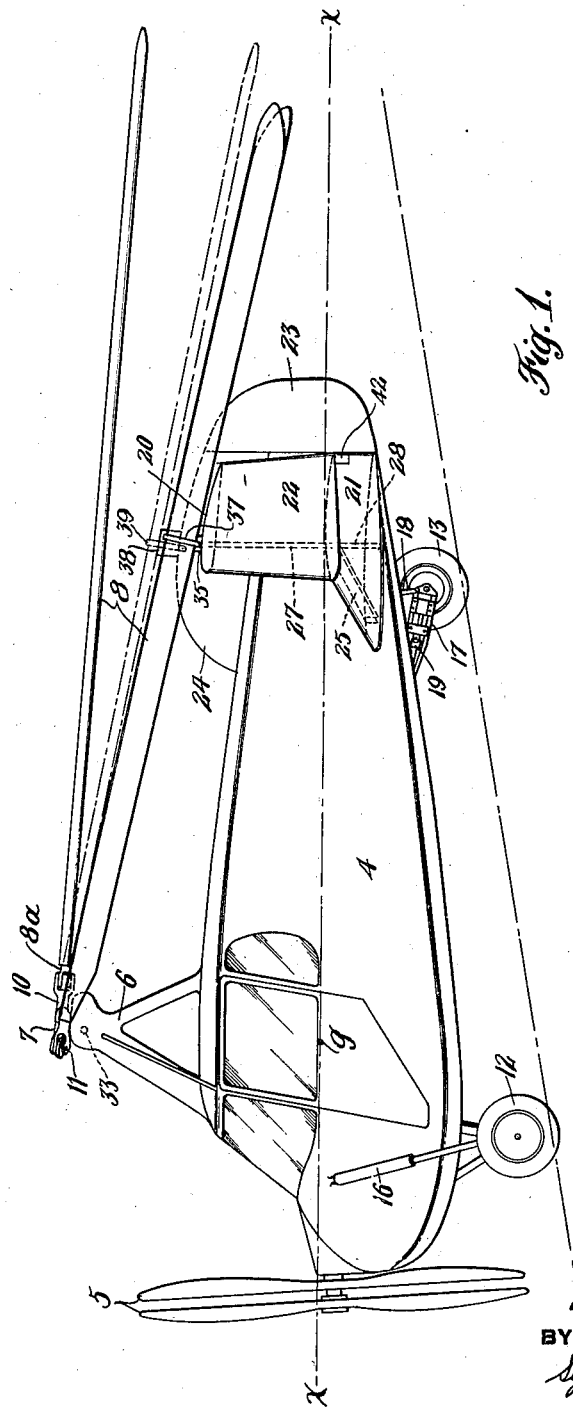

March 8, 1938.  A. E. LARSEN ET AL  2,110,443
EMPENNAGE FOR ROTARY WINGED AIRCRAFT
Filed Feb. 29, 1936  2 Sheets-Sheet 2
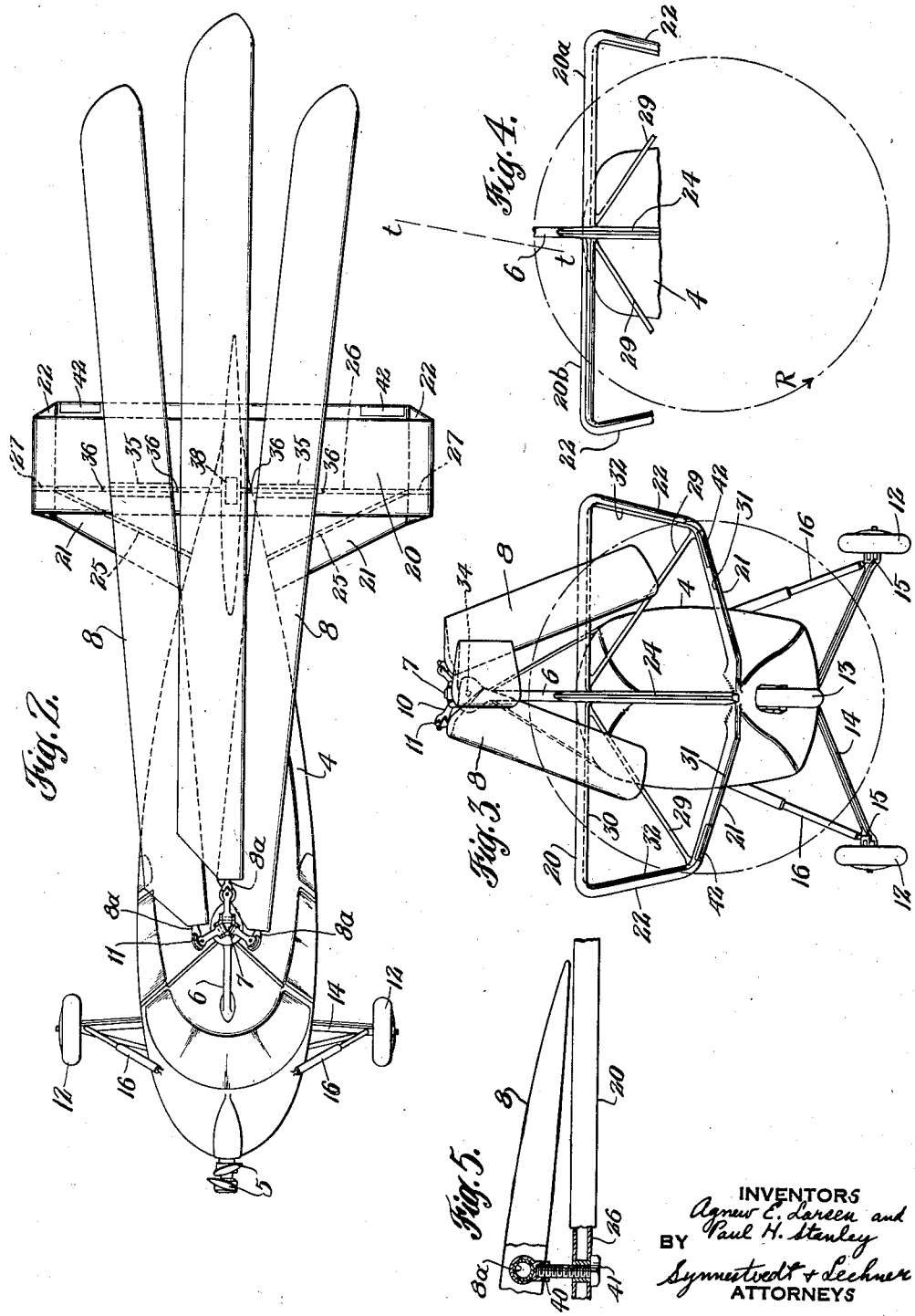
INVENTORS
Agnew E. Larsen and
Paul H. Stanley
BY
Synnestvedt + Lechner
ATTORNEYS Patented Mar. 8, 1938

2,110,443

UNITED STATES PATENT OFFICE 2,110,443

EMPENNAGE FOR ROTARY WINGED AIRCRAFT

Agnew E. Larsen, Huntingdon Valley, and Paul H. Stanley, Glenside, Pa., assignors to Autogiro Company of America, Willow Grove, Pa., a corporation of Delaware Application February 29, 1936, Serial No. 66,396

10 Claims. (Cl. 244—87)

This invention relates to an empennage structure and particularly such structure in an aircraft of the type having as its principal means of sustension a system of rotatively mounted blades or wings.

The invention is especially concerned with an aircraft of the general type mentioned above which is further adapted for road travel. Still further the improved empennage has especial usefulness in a road travel aircraft which is equipped with a control system comprising a means for controllably shifting the lift line of the rotor and also with means for folding the rotor blades for road travel.

In craft of this type a number of special considerations becomes of importance. In the first place, for road travel, the entire structure of the aircraft should preferably be kept within a relatively small transverse span. It is an object of this invention to meet this condition effectively and at the same time to provide stabilizing or similar surfaces efficiently giving the desired degree of directional, longitudinal and lateral stability.

The improvement in stability characteristics, coupled with flight control by shifting the lift line of the rotor, i. e., "direct control", provides a machine having an unusual degree of maneuverability under all conditions of flight and, in accordance with this invention, these desirable characteristics are further combined with stabilizing surfaces of small transverse span so that the machine may, with blades folded, readily be employed on the highways.

The invention further contemplates an empennage or tail structure especially adapted to aircraft of the character above described, which at the same time incorporates desirable structural and functional features and characteristics, among which might be mentioned unusual sturdiness and rigidity, improved distribution of material resulting in great efficiency in proportion to the weight, and improved arrangement for supporting the folded rotor blades, and a novel cooperation with the propulsion mechanism and controllable rudder.

A further object of the invention is the provision of means for fastening the rotor blades in folded position.

In addition, the invention contemplates provision in the empennage for counteracting the rolling moment produced by lateral excursion of the lift line of the rotor in high speed forward flight, or by the torque of the propulsion means where only one propeller is employed, or both, as will more fully appear hereinafter.

The manner in which the foregoing objects, and also others which will occur to those skilled in the art, are obtained, will be more apparent from a consideration of the following description, referring to the accompanying drawings, in which—

Figure 1 is a side view of an aircraft constructed in accordance with the present invention;

Figure 2 is a top plan view of the same;

Figure 3 is a rear elevation of the same;

Figure 4 is a fragmentary view similar to Figure 3, but illustrating a modification; and Figure 5 is an enlarged fragmentary detail view of a device for fastening the rotor blades in folded position.

The body of the craft is shown at 4 and is equipped with propulsion means shown as comprising a pair of reversely operated propellers 5 which may be driven by a propulsion engine mounted within the body, for example, in the manner disclosed in the copending application of James G. Ray, Harold F. Pitcairn and Agnew E. Larsen, Serial No. 14,304, filed April 2, 1935.

The sustaining rotor may be mounted above the body by means of a pylon 6, the same including a hub 7 to which a plurality of blades 8 (three in the example shown) are pivotally attached by means of horizontal or "flapping" pivots 9, extension links 10 and upright or "drag" pivots 11.

In the drawings the three blades are shown as being folded so that they all extend in a generally rearward direction over the tail of the machine, although it will be understood that in normal flight the blades rotate in substantially symmetrical spacing about the hub.

The machine is provided with wheels 12—12 and 13, the two wheels 12 constituting a forward pair mounted by means of struts 14 to which they are attached by knuckles 15 providing for steering. Shock absorption in landing is provided for by the shock struts 16.

The single rear wheel 13 may be mounted in a yoke 17 pivoted toward its forward end and provided with a shock absorber, the lower end of which appears at 18, in the manner taught in the aforementioned copending application. As in said prior application, the rear wheel 13 may also be driven as by means of a drive shaft 19. The mounting of the wheel 13 and also of the wheels 12, and the drive for the former and steering arrangements for the latter, need not be considered in detail herein since they form no part of the present invention per se. These wheel arrangements, of course, provide for travel of the machine on the highways.

In accordance with the present invention the empennage incorporates an upper approximately horizontal surface 20 and subjacent positively dihedral surfaces which may be made in two parts 21 and 22, arranged at different dihedral angles as clearly appears in Figure 3, so that, in effect, the elements 21 provide some stability both in pitch and in roll and the elements 22 primarily in yaw and roll. These surfaces have a relatively small transverse span and are joined together to form a box-like structure. To the rear of this box and centrally located with respect to it is a rudder 23 from which a vertical fin 24 extends forwardly along the upper edge of the rear portion of the body.

The inner dihedraled surfaces 21 are preferably tapered in width from a point adjacent the body outwardly, this taper being clearly shown in Figure 2. These surfaces 21 further incorporate structural supporting elements including a main spar structure 25 which, as clearly seen in Figures 1 and 2, extends parallel to the forward angled edge of each surface 21, the spar structures 25 thus being inclined with respect to the transverse axis of the empennage when viewed in plan. The top surface further incorporates a principal structural element or device 26 which is preferably arranged to join the upper ends of the similar structural members 27—27 of the dihedraled surfaces 22—22. At their lower ends these latter elements 27 join the outer ends of the support elements 25 of the lower surfaces 21—21. If desired the structure of the surfaces 21—21 may further include elements 28.

In addition to the internal main framing of the empennage referred to above, diagonal braces 29—29 are also provided, these being extended (see Figure 3) from the central portion of the upper stabilizer 20 outwardly and downwardly to the junction of the pairs of dihedraled surfaces 21—22. In this way a very rigid tail structure is provided not only in a transverse vertical plane but also in other directions, including a horizontal plane, the angled elements 25 being of particular importance in connection with the latter.

The strength and rigidity of this empennage structure is of importance not only for general reasons but also because of two characteristics which are peculiar to the general type of machine here under consideration. In the first place, for road travel the increased strength and rigidity is highly important because of rough roadway conditions sometimes necessarily encountered. Secondly, the empennage forms an effective support for at least some of the rotor blades when they are folded back over the tail as clearly seen in Figures 1 and 2.

As seen in Figures 1, 2 and 3, two of the blades 8 have been swung back, one at either side, and supports such as wood blocks 35, formed to fit the blade curvature, have been interposed between each such blade and the upper tail surface 20, in line with the main internal frame member 26 thereof. As seen in Figure 2, snap fasteners 36, secured into said spar, are provided, and as shown in Figure 1 a strap 37, for each blade, passes over the same and snaps onto a fastener 36, holding the blade in place on said block 35. The third blade, positioned centrally over the fin 24, is shown in full lines in the drawings, ready to be lowered upon its supporting block 38. This blade may be lowered to the dotted line position, shown in Figure 1, by tilting the rotor axis 7 rearwardly about the rotor control pivot 33 (later to be referred to). A similar strap 39 is used to hold the middle blade in position on the top of the fin 24. It will be noted that the blocks rest on rigid structure of the tail, and that the blades receive support directly and beneath their main longitudinal spars 8a which run throughout the length of the blade.

In Figure 5, we have illustrated, in end elevation, on a larger scale, a portion of a rotor blade 8 in position over the tail surface 20, portions of the blade and tail surface being broken away to show a modified form of blade support. In this form of construction, the blade spar 8a is provided with a threaded socket 40, rigidly secured to the longitudinal spar of the blade and opening at the bottom surface of the blade. A bolt 41 is threaded through the tail spar 26 and into the socket 40, thus holding the blade firmly in position, and, if desired, in slightly spaced relation above the surface of the tail.

While, as above stated, the empennage somewhat resembles a box, it will be noted that the pairs of surfaces 21—22 at each side in effect constitute a double or broken dihedral stabilizer, the two portions of which are dihedraled at different angles. Tests have shown this to constitute a highly effective arrangement in stabilizing the machine, particularly when the several surfaces of the empennage are so set as to provide a thrust or lift effect outwardly or away from the interior of the box or cellule, and further with the bottom dihedraled surfaces provided with a raked forward edge.

The present invention thus contemplates producing a funnel effect by means of the surfaces 20, 21 and 22. To this end the upper surface 20 is set at a positive lift incidence with respect to the reference line $x$—$x$. The lower surfaces 21—21 are set at an angle which is negative with respect to the setting of the surface 20 and may even be set at a slightly negative lift incidence with respect to the reference line. Each of the laterally offset surfaces 22—22 is set to produce a lateral thrust effect toward that side of the machine on which it is located. The relation of the airfoil sections of the surfaces 20 and 21 with respect to the line $x$—$x$ appears clearly in Figure 1 and in Figure 3 it will be noted that the trailing edge 32 of each surface 22 appears relatively close to the inner side thereof. This, of course, will produce the lateral thrust effect referred to.

While any desired airfoil sections may be employed in these tail surfaces we prefer to use sections which are asymmetrically cambered. What would normally be the top surface of a nonsymmetrically cambered airfoil constitutes the outer surface of each of the dihedral members 22—22. The trailing edges of surfaces 20, 21 and 22 are indicated, respectively, at 30, 31 and 32.

This arrangement of tail cellule, though not wider than approximately twice the overall width of the body of the craft, and thus practical for road travel, is of substantial ruggedness and rigidity, and provides a tail area of sufficient aerodynamics, even on a machine of short fuselage length, to obtain positive stability of the body, in pitch, yaw and roll, independent of the rotor, which is desirable in the direct control type of machine, where the control, as well as the sustension, is effected by shifting the lift line of the rotor.

Returning now to the mounting of the rotor, the shift in the lift line thereof for control purposes may be desirably obtained by tilting of the rotor hub itself, a transverse fulcrum 33 for longitudinal tilt and thus longitudinal control being indicated in Figure 1 and a longitudinal fulcrum 34 for lateral tilt, and thus control of banking and turning being indicated in Figure 3. It should be observed that even in a machine of relatively short fuselage construction, and thus of short tail lever arm from the center of gravity $g$, the empennage of the present invention provides ample inherent stability of the body to cooperate with the tiltable rotor in effecting all necessary maneuvers of the craft. This combination of features in conjunction with the pair of reversely rotating propellers (which balance out the effects of propeller torque reaction) results in a stable and yet highly maneuverable machine.

Trimming or fixed adjustment pads 42 may be formed at the outer ends of the lower dihedral surfaces 21.

Turning now to the modification shown in Figure 4, it will be seen that the right-hand half 20a of the upper tail surface is the same as the corresponding surface in Figure 3. The left-hand half 20b, however, is of the same airfoil section, but reversed so as to produce a negative lift effect on the left side. In a machine where only a single propeller is employed, rotating in the direction of the arrow R, there is a rolling reaction set up in the body of the craft in the opposite direction. In addition, we have found that the lateral inclination of the rotor thrust, indicated by the line t—t, occurring at high forward speeds, produces a rolling couple acting in the same sense as the propeller torque reaction. We have further found that the rolling moment produced by the rotor is substantially at its maximum at top speed of the machine and at its minimum at low speed or in vertical descent, whereas the propeller torque reaction (where only one propeller is employed) is more effective at low flight speeds, and particularly so when the throttle is open during vertical descent.

An approximate averaging of the rolling moment, throughout the speed range, thus occurs, and we so set the two relatively inverted sections 20a and 20b as to substantially counteract the rolling moment throughout the speed range. This further has the benefit of relieving the rotor tilting control of the burden of counteracting both the propeller and the rotor rolling moments.

Where a pair of oppositely rotating propellers is employed, the inverted setting of the tail may be made just sufficient to overcome at high speed the rolling couple produced by the rotor.

We claim:

1. In an aircraft having a sustaining rotor, an empennage including a substantially horizontal surface, a pair of dihedraled surfaces, the first and second surfaces being vertically spaced from each other, and a pair of generally upright surfaces joining the ends of the first and second surfaces.

2. In an aircraft having a sustaining rotor, an empennage including a substantially horizontal surface, a pair of dihedraled surfaces, the first and second surfaces being vertically spaced from each other, and a pair of generally upright surfaces joining the ends of the first and second surfaces, the generally upright surfaces being inclined upwardly and outwardly.

3. In an aircraft having a sustaining rotor, an empennage including a substantially horizontal surface, a pair of dihedraled surfaces, the first and second surfaces being vertically spaced from each other, and a pair of generally upright surfaces joining the ends of the first and second surfaces to form therewith an open box or cellule, all of said surfaces being set to produce a lift or thrust effect away from the interior of the box to provide a funnel effect.

4. In an aircraft having a sustaining rotor, an empennage including a pair of dihedraled surfaces each one of which is divided into sections both set at a dihedral angle but with an outer section positioned at a sharper dihedral than an inner section, and substantially horizontal surfacing extended between and joining the upper and outer ends of the pair of dihedraled surfaces.

5. In an aircraft having a sustaining rotor, an empennage incorporating an upper horizontal surface, and a pair of lower dihedraled surfaces, the upper surface being positioned at a positive lift angle with respect to the reference line of the craft and the lower surfaces positioned at a negative lift angle with respect to the reference line of the craft.

6. In an aircraft having a sustaining rotor, an empennage incorporating upper and lower surfaces, the upper one of which is positioned at a positive lift angle with respect to the reference line of the craft and the lower one of which is positioned at a negative lift angle with respect to the reference line of the craft, and a pair of sharply dihedraled surfaces spaced laterally from the longitudinal axis of the craft and each set at an angle providing a lateral thrust effect toward that side of the craft on which it is located.

7. In an aircraft having a sustaining rotor, an empennage incorporating an upper substantially horizontal surface positioned at a positive lift angle with respect to the reference line of the craft, a broken or double dihedraled surface at each side of the craft having sections dihedraled at different angles, the lower dihedraled sections being positioned at a negative lift angle with respect to the reference line of the craft and the sharply dihedraled sections each being set at an angle providing a lateral thrust effect toward that side of the craft on which it is located, the upper edges of the sharply dihedraled sections being joined with the outer ends of the horizontal surface to form a box-like structure.

8. In an aircraft having a sustaining rotor, a box-like empennage incorporating upper and lower surfaces and laterally spaced dihedraled surfaces joining the ends of the first surfaces, and a brace for said box interconnecting the central portion of the upper surface with the junction of the lower surface with one of the dihedral surfaces.

9. In an aircraft having a sustaining rotor, an empennage including substantially horizontal surfacing, a pair of broken or double dihedraled surfaces each having an inner and an outer section with the latter set at a more sharply dihedraled angle than the former, the upper ends of the outer sections being joined with the outer ends of the horizontal surfacing, and a brace joining the central portion of the horizontal surfacing with the junction between sections of one of the dihedraled surfaces.

10. In an aircraft having a sustaining rotor, a tail structure including upper and lower surfaces and side surfaces joining the ends of the upper and lower surfaces, a brace for said surfaces extending diagonally from a center portion of one of the surfaces first mentioned to the junction of the other of the first surfaces with a side surface, one of the first surfaces being of diminishing width toward its outer end and a main structural supporting element for the surface last mentioned extended therein at an angle to said brace when viewed in top plan.

AGNEW E. LARSEN.
PAUL H. STANLEY.